US006926331B2

(12) United States Patent
Cho

(10) Patent No.: US 6,926,331 B2
(45) Date of Patent: Aug. 9, 2005

(54) STRUCTURE FOR LOCKING A ROD OF A GLOVE BOX

(75) Inventor: Joung-hwan Cho, Incheon Metropolitan (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 10/743,762

(22) Filed: Dec. 24, 2003

(65) Prior Publication Data

US 2005/0104399 A1 May 19, 2005

(30) Foreign Application Priority Data

Nov. 19, 2003 (KR) ...................... 10-2003-0082291

(51) Int. Cl.[7] .................................................. B60N 3/12
(52) U.S. Cl. ........................... 296/37.12; 292/DIG. 41; 296/37.8
(58) Field of Search ............................... 296/37.12, 70, 296/37.8; 292/DIG. 41, 178, DIG. 43; 70/159, 70/145, 57.1, 238, 261; 280/752, 732, 748; 16/66; 180/90

(56) References Cited

U.S. PATENT DOCUMENTS

| | | | |
|---|---|---|---|
| 5,190,314 A | | 3/1993 | Takasugi |
| 5,484,178 A | | 1/1996 | Sandhu et al. |
| 5,535,608 A | * | 7/1996 | Brin .................... 292/DIG. 43 |
| 5,782,510 A | * | 7/1998 | Gass ................... 292/DIG. 41 |
| 5,931,031 A | * | 8/1999 | Bouan ........................ 70/57.1 |
| 6,120,069 A | * | 9/2000 | Taranto ............... 292/DIG. 41 |
| 6,164,711 A | * | 12/2000 | Neal et al. ............... 296/37.12 |
| 6,669,243 B2 | * | 12/2003 | Katoh et al. ............... 296/37.8 |
| 2004/0017088 A1 | * | 1/2004 | Sawatani et al. ........... 292/178 |
| 2004/0168487 A1 | * | 9/2004 | Sawatani et al. ............. 70/145 |

FOREIGN PATENT DOCUMENTS

| | | | |
|---|---|---|---|
| DE | 33 36 952 | * | 6/1984 |
| JP | 5-338500 | * | 12/1993 |
| JP | 2002-274273 | * | 9/2002 |

* cited by examiner

*Primary Examiner*—Kiran B. Patel
(74) *Attorney, Agent, or Firm*—Greenblum & Bernstein, P.L.C.

(57) ABSTRACT

A structure for locking a rod of a glove box comprises a rod withdrawably installed at a side surface of a glove box to accomplish a function of a locking device; and a guide part formed with a material having a resilient characteristic at a side surface of a crash pad at which the rod is withdrawn to insert and lock the rod, and installed to be inclined to a inserting direction of the rod. According to the present invention, the structure for locking a rod of a glove box has an effect of reducing noise since the rod is operated smoothly when used to lock the glove box.

8 Claims, 5 Drawing Sheets

STRUCTURE FOR LOCKING A ROD OF A GLOVE BOX

RELATED APPLICATION

The present disclosure relates to subject matter contained in Korean application No. 2003-82291, filed on Nov. 19, 2003, which is herein expressly incorporated by reference its entirety.

BACKGROUND OF THE INVENTION

1. Field of the Invention

The present invention relates to a structure for locking the rod of a glove box, and more particularly, to a structure for locking the rod of a glove box provided with a guiding part having resilient characteristics at a groove portion for inserting and fixing the rod to prevent noise when the rod is operated.

2. Description of the Related Art

Generally, a glove box for an automobile is installed in front of a seat next to the driver, and used to store small items.

Hereinafter, a prior art glove box will be described in conjunction with the accompanying drawings.

As shown in FIG. 1, the prior art glove box 1 is provided with a receiving case 3 for forming a predetermined space in an inner side, and the receiving case 3 has a front panel 5 on its front surface.

An operating handle 6 is installed at an open part of one side of the front panel 5, and the glove box 1 is opened/closed from an instrument panel by means of a method where the operation handle 6 is pulled by a finger inserted therein.

By operating the operation handle 6, the glove box 1 is opened/closed as a rod 7 protruding outward from a side part of the glove box 1 located at a rear side of the front panel 5 is moved.

An operation of the rod 7 at the side surface of the glove box 1 will be specifically described in conjunction with FIG. 2.

Formed at the side surface of the glove box 1 is a hole 9 for moving outward the rod 7, and the rod 7 moved outward along the hole 9 is inserted and fixed to the mounting hole 12 formed on a side surface of a crash pad 10 to correspond with the hole 9 formed at the side surface of the glove box 1.

In addition, when a user operates a knob formed at a front surface to open the glove box 1, the rod 7 is moved inward to the glove box 1 to be separated from the mounting hole 12.

According to the structure for locking a rod of a glove box, the mounting hole 12 is simply formed at the side surface of the crash pad 10 in order to lock the rod 7.

In an operation that the rod 7 is inserted into or separated from the mounting hole 12 functioninga as a simple locking structure, a peripheral part of the mounting hole 12 is in frictional contact with the side surface of the rod 7 to generating noise.

Further, the friction between the peripheral part of the mounting part 12 and the rod 7 prevents the rod 7 from smoothly operating.

SUMMARY OF THE INVENTION

It is an object of the present invention to provide a structure for locking a rod of a glove box capable of providing improved operation and lower noise generation by reducing friction when the rod for functioning as a locking device of a glove box is used.

In accordance with the present invention, there is provided a structure for locking the rod of a glove box comprising a rod installed on a side surface of a glove box to lock the glove compartment; and a guiding portion formed of a material having resilient characteristics on a side surface of a crash pad where the rod is withdrawn to insert and lock the rod, and installed to incline in a direction of the rod.

Preferably, the guiding part is integrally or individually formed with the crash pad to be fixed onto a mounting part of the crash pad and bent into place.

According to the present invention, the structure for locking a rod of a glove box has the effect of decreasing noise when the rod is used as a locking device for the operation of the glove box.

BRIEF DESCRIPTION OF DRAWINGS

Other objects and aspects of the present invention will become apparent from the following description of embodiments with reference to the accompanying drawings in which.

DESCRIPTION OF THE PREFERRED EMBODIMENT

Hereinafter, a preferred embodiment of the present invention will be apparent from the following description in conjunction with the accompanying drawings.

Figure 1:
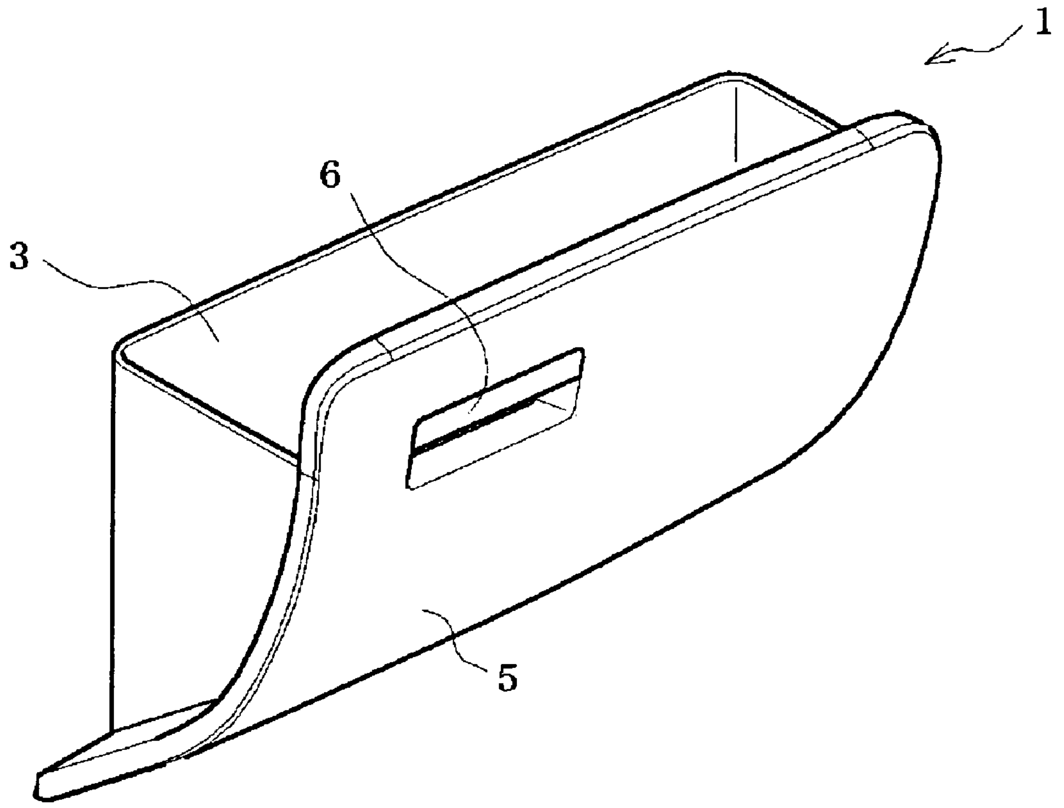
FIG.1 (PRIOR ART)
FIG. 1 is a perspective view for illustrating a conventional glove box.
Figure 2:
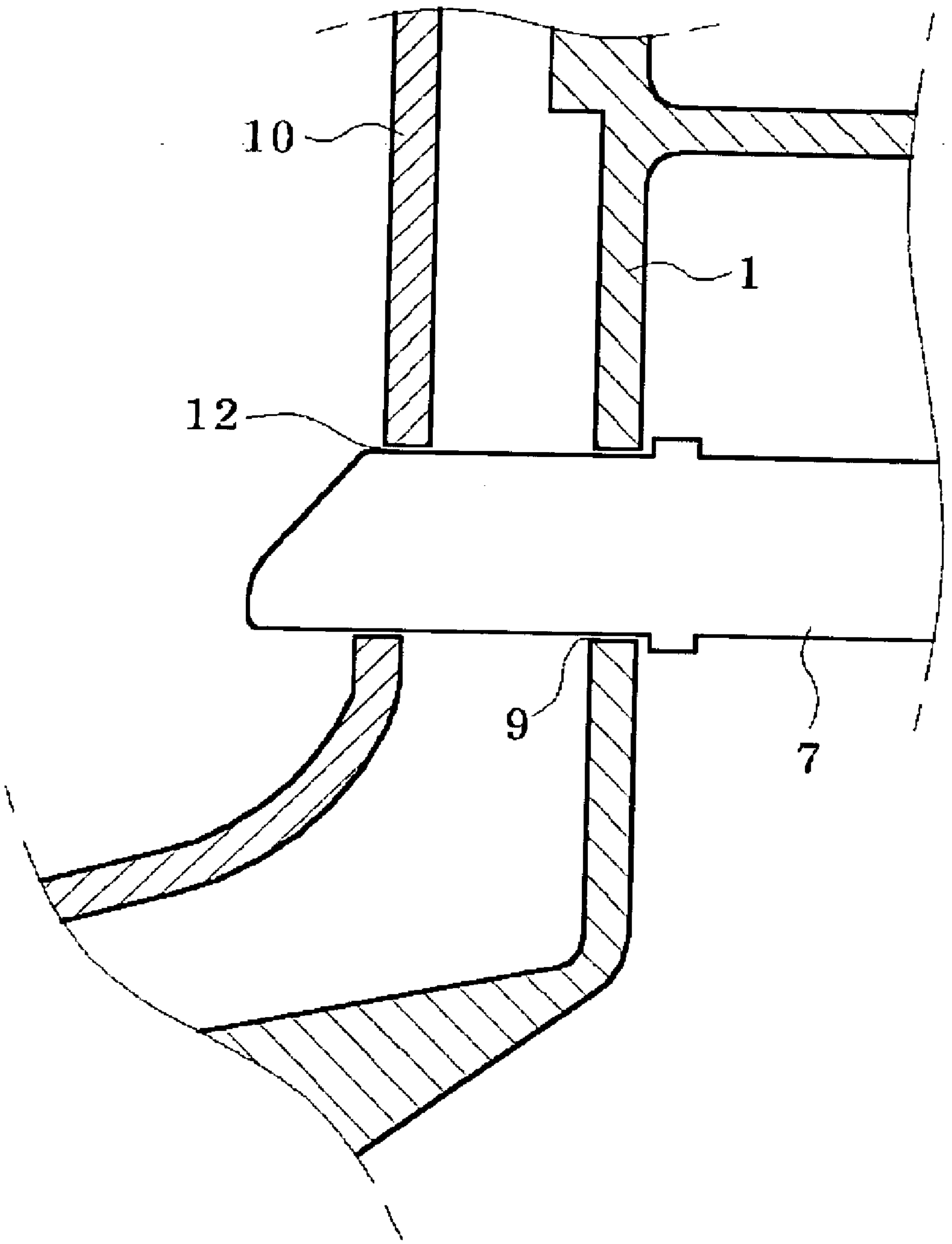
FIG.2 (PRIOR ART)
FIG. 2 is a sectional view for illustrating a prior art structure for locking a rod of a glove box.
Figure 3:
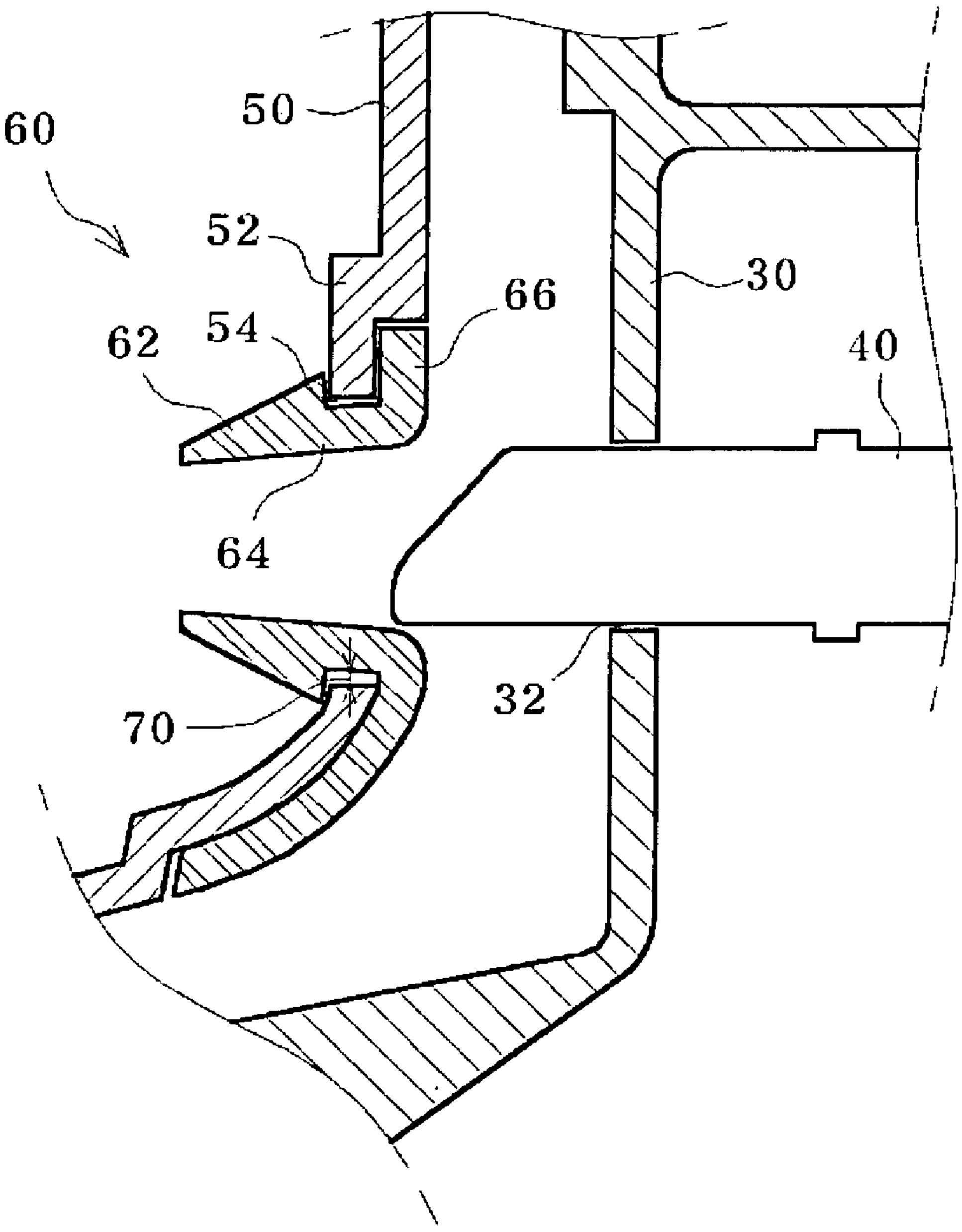
FIG. 3 is a sectional view for illustrating a structure for locking a rod of a glove box in accordance with an embodiment of the present invention.
Figure 4:
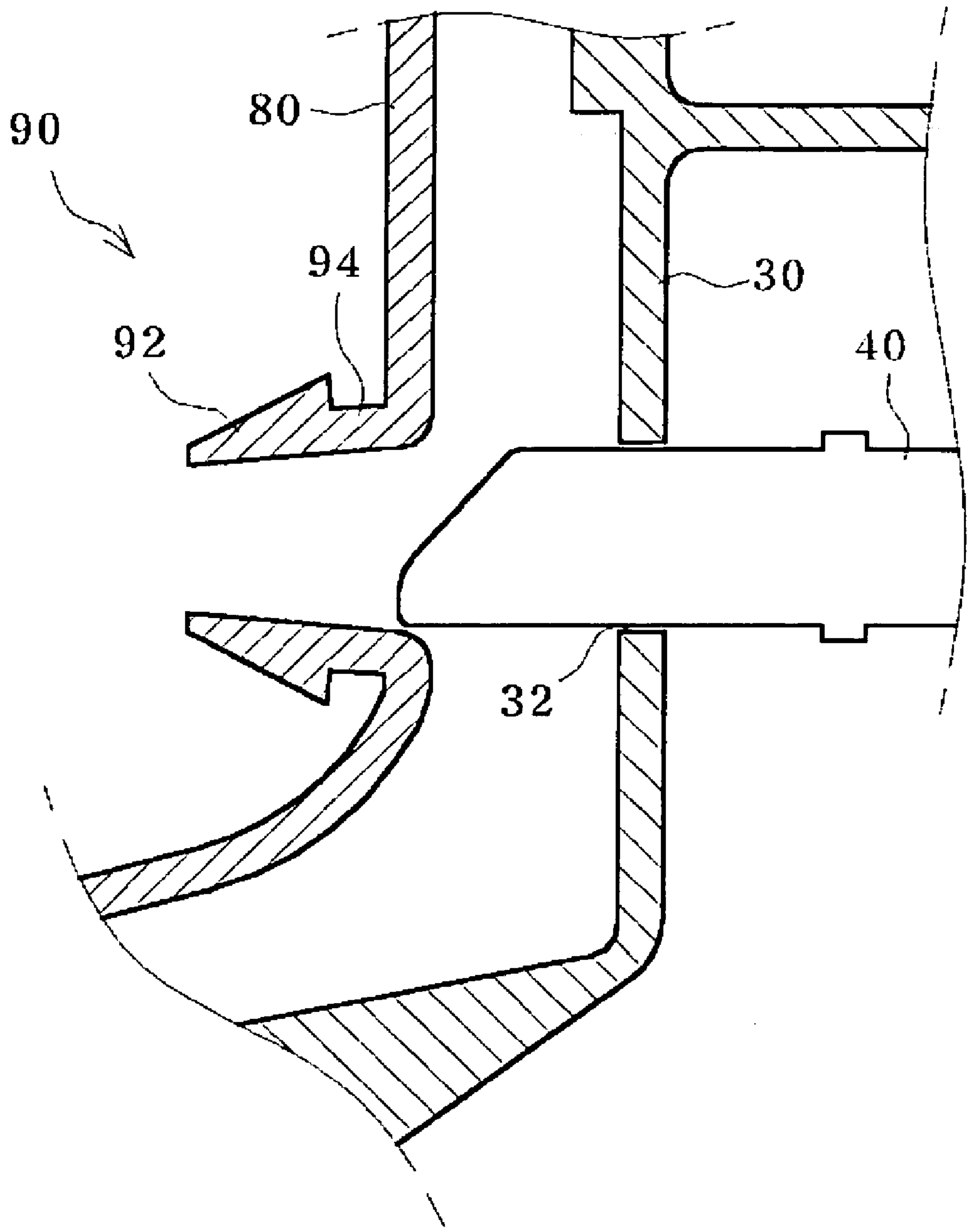
FIG. 4 is a sectional view for illustrating a structure for locking the rod of a glove box in accordance with another embodiment of the present invention.
Figure 5:
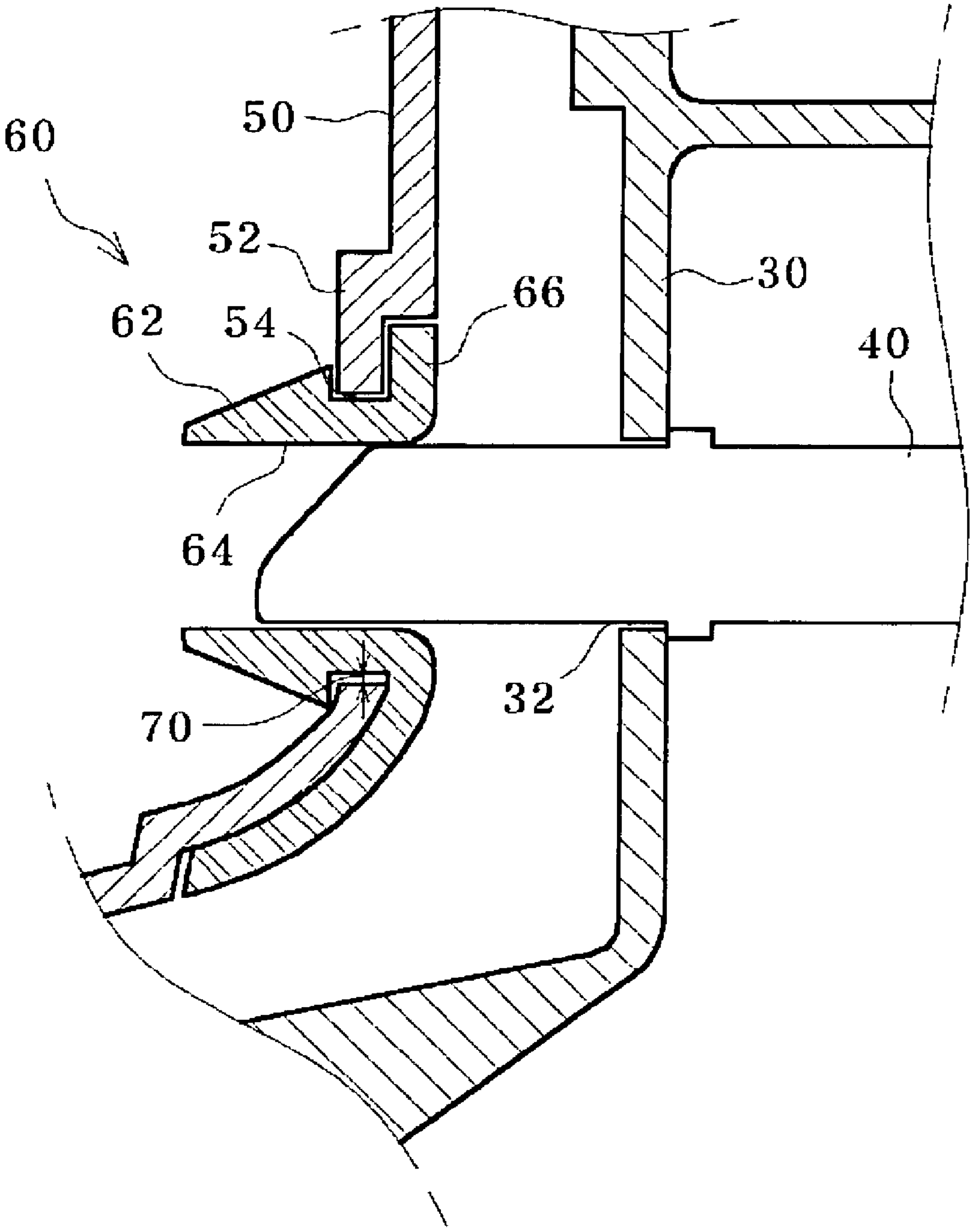
FIG. 5 is a sectional view for illustrating a state that the rod shown in FIG. 3 is operated.

FIG. 3 is a sectional view for illustrating a structure for locking the rod of a glove box in accordance with an embodiment of the present invention, FIG. 4 is a sectional view for illustrating a structure for locking a rod of a glove box in accordance with another embodiment of the present invention, and FIG. 5 is a sectional view for illustrating a state that the rod shown in FIG. 3 is operated.

The structure for locking a rod of a glove box in accordance with an embodiment of the present invention will be described in conjunction with FIG. 3.

A glove box 30 is provided with a hole 32 at its side surface, and a rod 40 operated by an operation handle is located at the hole 32.

A side surface of the crash pad 50 corresponding to a position where the hole 32 is formed is provided with a mounting part 52 formed in a stepped manner to an inner side (left side with reference to FIG. 3).

The mounting part 52 is provided with a mounting hole 54 formed at a position corresponding to the hole 32, and the diameter of the mounting hole 54 is larger than that of the hole 32.

A resilient guide part 60 fixed to the mounting part 52 is provided with a fixing part 66 fixed to the mounting part 52; a connecting part 64 connected to the fixing part 66 to pass through the mounting hole 54 and installed on a slope in the direction of the rod 40; and a cone shaped head 62 formed at one end of the connecting part 64.

The resilient guide part 60 is made of a resilient material, and inclined at a predetermined angle toward the center of the mounting hole 54.

The connecting head 64 of the resilient guide part 60 forms a operating section 70 spaced apart from the mounting part 52, and the operating section 70 becomes the operating distance of the guiding part 60 resiliently pushed in by the rod 40.

Hereinafter, an operation of the structure for locking the rod of a glove box in accordance with an embodiment of the present invention including the above constitution will be described.

When a passenger operates the handle at the front surface of the glove box 30, the rod 40 is moved in the direction of the guiding part 60 through the hole 32 formed at the side surface of the glove box 30.

By means of the operation of the rod 40, the connecting part 64 and the head part 62 of the guidinge part 60 are spaced apart from each other in an upward or downward motion. (with reference to FIG. 3).

By means of the above operation, as shown in FIG. 5, the rod 40 maintains a state fixed to the guiding part 60, and the guiding part 60 is deformed back to its limit to reduce the speed and operating force of the rod 40 contacted therewith.

Hereinafter, another embodiment of the present invention will be described in conjunction with FIG. 4.

As shown in FIG. 4, the resilient guide part 90 is integrated with the side surface of the crash pad 80 for inserting the rod 40.

The crash pad 80 is integrally formed with the connecting part 94 of the resilient guide part 90, and one end of the connecting part 94 is formed as a cone shape, and provided with the head part 92 formed sloping as it moves toward the rod 40.

An operation of the resilient guide part 90 in accordance with another embodiment of the present invention is the same as the operation of the resilient guide part 60 in accordance with an embodiment of the present invention.

The resilient guide parts 60 and 90 is installed to have a slope in the inserting direction of the rod 40 such that the guide parts 60 and 90 have a smaller diameter than that of the rod 40. Various modifications of the resilient guide parts 60 and 90 will be apparent from the technological spirit that the guiding parts 60 and 90 are deformed by the resilient characteristic upon insertion of the rod 40 to decrease the speed and operating force on the inserting operation of the rod 40, thereby lowering noise generating.

As described hereinabove, the structure for locking the rod of a glove box in accordance with the present invention has an advantage of decreasing the noise generated and improving overall operation since friction and operation speed of the rod is reduced by the resilient deformation of the guiding part when the rod is used to lock the glove box.

While this invention has been described in connection with what is presently considered to be the most practical and preferred embodiments, it is to be understood that the invention is not limited to the disclosed embodiments, but on the contrary, it is intended to cover various modification within the spirit and scope of the appended claims.

What is claimed is:

1. A structure for locking a rod of a glove box, the rod being installed on a side surface of the glove box, comprising:

a resilient guide formed of a resilient material and provided on a side surface of a crash pad, said resilient guide being inclined with respect to a longitudinal direction of the rod, and being engageable by the rod when the rod is moved toward said resilient guide, such that the rod frictionally engages and deflects said resilient guide, whereby the resilient guide frictionally retains the rod in a locked position.

2. The structure according to claim 1, wherein said guide is integrally formed with the crash pad.

3. The structure according to claim 1, wherein said guide is formed separately from the crash pad and configured to be fixed at a mounting part of the crash pad by bending.

4. The structure according to claim 1, wherein the guide includes a cone protruding from the crash pad in the inserting direction of the rod.

5. A structure for locking a rod of a glove box comprising:

a rod installed on a side surface of a glove box to form a locking device; and a resilient guide provided on a side surface of a crash pad to receive and lock the rod, the resilient guide being formed of a resilient material, and wherein the guide includes portions slopping toward each other in the inserting direction of the rod such that the guide is deformed to reduce the speed and operation force of the rod.

6. The structure according to claim 5, wherein said guide is integrally formed with the crash pad.

7. The structure according to claim 5, wherein said guide is formed separately from the crash pad and configured to be fixed at a mounting part of the crash pad by bending.

8. The structure according to claim 5, wherein the guide includes a cone protruding from the crash pad in the inserting direction of the rod.

* * * * *